US012038930B2

(12) United States Patent
Rahman

(10) Patent No.: US 12,038,930 B2
(45) Date of Patent: Jul. 16, 2024

(54) PERSONALIZED SEARCH METHOD AND SYSTEM USING SEARCH TERMS OF INTEREST TO FIND CLOSE PROXIMITY LOCATIONS OF LISTED PROPERTIES

(71) Applicant: Husam Rahman, Pearland, TX (US)

(72) Inventor: Husam Rahman, Pearland, TX (US)

(*) Notice: Subject to any disclaimer, the term of this patent is extended or adjusted under 35 U.S.C. 154(b) by 0 days.

(21) Appl. No.: 17/944,253

(22) Filed: Sep. 14, 2022

(65) Prior Publication Data

US 2024/0086411 A1 Mar. 14, 2024

(51) Int. Cl.
*G06F 16/245* (2019.01)
*G06F 16/2457* (2019.01)
*G06F 16/29* (2019.01)

(52) U.S. Cl.
CPC ........ *G06F 16/24575* (2019.01); *G06F 16/29* (2019.01)

(58) Field of Classification Search
CPC .................................. G06F 16/24575
See application file for complete search history.

(56) References Cited

U.S. PATENT DOCUMENTS

2013/0311460 A1* 11/2013 Lieske, Jr. .......... G06F 16/9537
707/724

* cited by examiner

*Primary Examiner* — Baoquoc N To
(74) *Attorney, Agent, or Firm* — Cygnet IP Law, P.A.; Stephen W. Aycock, II

(57) ABSTRACT

Computer-implemented improved real estate search methods, systems, and computer-readable media are described.

20 Claims, 12 Drawing Sheets

Fig. 4
PERSONALIZED SEARCH METHOD AND SYSTEM USING SEARCH TERMS OF INTEREST TO FIND CLOSE PROXIMITY LOCATIONS OF LISTED PROPERTIES

FIELD

Some implementations are generally related to computerized real estate search system, and, more particularly, to improved real estate search systems, methods and user interfaces including a process of better defining a desired real property for more accurate and efficient searching of available listings (e.g., homes for sale, homes for rent, commercial properties for sale or rent, or any other type of real estate listing).

BACKGROUND

Conventional real estate search system, such as those accessible via the Internet, may provide ways to search for a real property such as a house using criteria such as number of bedrooms, number of bathrooms, zip code, city, etc. However, conventional real estate search systems may not provide a method to better define a desired house in terms of where the house is located and in terms of the house's distance from one or more other locations in view of a mode of transport, which translates into a travel time to the one or more other locations. Moreover, conventional search systems do not provide a way for a user to narrow a search based on the travel time to the one or more other locations among other things. Conventional techniques may list proximity to interest areas after the residency locations are selected.

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

SUMMARY

Some implementations can include a computer-implemented method. The method can include receiving a primary location, receiving one or more real property criteria, and receiving one or more secondary locations and a mode of transportation associated with each secondary location. The operations can also include accessing a database of real properties listed for sale or lease, querying the database of real properties using a search query including the primary location and the one or more real property criteria, and receiving a result set from the database of real properties in response to the querying, wherein the result set includes real properties in the database that meet the search query. The operations can further include clustering the result set into one or more clusters of real properties, for each cluster of the one or more clusters, determining a travel time from each secondary location to each cluster based on the mode of transportation for that secondary location.

The operations can also include causing the result set to be displayed on a map graphical user interface, receiving an indication of a selection of one of the real properties on the map, and causing an expanded map section to be displayed that includes the selected real property and the one or more secondary locations associated with the selected real property.

In some implementations, the primary location can include one or more of a postal code, a street address, a city, or a county. In some implementations, the one or more real property criteria includes one or more of a listing price range, a number of bedrooms range, and a number of bathrooms range. In some implementations, the one or more secondary locations can include a street address, or a location type.

In some implementations, the mode of transportation includes one of car, train, bus, bicycling, or walking. In some implementations, the clustering includes clustering the real properties in the result set into one or more clusters based on respective locations of the real properties in the result set.

In some implementations, determining travel time from each secondary location to each cluster includes accessing a mapping service to determine a geographic location of each of the secondary locations relative to a corresponding cluster, querying the mapping service using the geographic location of each of the secondary locations, a geographic location of the corresponding cluster, and the mode of transportation associated with the secondary location, and receiving a travel time from the geographic location of the corresponding cluster to each of the secondary locations.

The method can further include saving the primary location, the one or more real property criteria, the one or more secondary locations, and the mode of transportation associated with each secondary location as a saved search query, executing the saved search query to obtain an updated search result set, and transmitting a notification of any real properties in the updated search result set not in the result set.

The method can also include receiving one or more desired travel times associated with corresponding secondary locations, generating a filtered result set of real properties from the result set based on a comparison of the travel times from each cluster to each associated secondary location with the desired travel time for the corresponding secondary location, and causing a map showing the filtered result set of real properties to be displayed.

Some implementations can include a system comprising one or more processors coupled to a computer-readable medium having stored thereon software instructions that, when executed by the one or more processors, cause the one or more processors to perform operations. The operations can include receiving a primary location, receiving one or more real property criteria, and receiving one or more secondary locations and a mode of transportation associated with each secondary location. The operations can also include accessing a database of real properties listed for sale or lease, querying the database of real properties using a search query including the primary location and the one or more real property criteria, and receiving a result set from the database of real properties in response to the querying, wherein the result set includes real properties in the database that meet the search query. The operations can further include clustering the result set into one or more clusters of real properties, for each cluster of the one or more clusters, determining a travel time from each secondary location to each cluster based on the mode of transportation for that secondary location, and causing the result set to be displayed on a map graphical user interface. The operations can also include receiving an indication of a selection of one of the real properties on the map, and causing an expanded map section to be displayed that includes the selected real property and the one or more secondary locations associated with the selected real property.

In some implementations, the primary location can include one or more of a postal code, a street address, a city, or a county. In some implementations, the one or more real property criteria includes one or more of a listing price range, a number of bedrooms range, and a number of bathrooms range. In some implementations, the one or more secondary locations can include a street address, or a location type.

In some implementations, the mode of transportation includes one of car, train, bus, bicycling, or walking. In some implementations, the clustering includes clustering the real properties in the result set into one or more clusters based on respective locations of the real properties within the result set.

In some implementations, determining travel time from each secondary location to each cluster includes accessing a mapping service to determine a geographic location of each of the secondary locations relative to a corresponding cluster, querying the mapping service using the geographic location of each of the secondary locations, a geographic location of the corresponding cluster, and the mode of transportation associated with the secondary location, and receiving a travel time from the geographic location of the corresponding cluster to each of the secondary locations.

The operations can also include saving the primary location, the one or more real property criteria, the one or more secondary locations, and the mode of transportation associated with each secondary location as a saved search query, executing the saved search query to obtain an updated search result set, and transmitting a notification of any real properties in the updated search result set not in the result set.

The operations can further include receiving one or more desired travel times associated with corresponding secondary locations, generating a filtered result set of real properties from the result set based on a comparison of the travel times from each cluster to each associated secondary location with the desired travel time for the corresponding secondary location, and causing a map showing the filtered result set of real properties to be displayed.

Some implementations can include a computer-readable medium having stored thereon software instructions that, when executed by one or more processors, cause the one or more processors to perform operations. The operations can include receiving a primary location, receiving one or more real property criteria, and receiving one or more secondary locations and a mode of transportation associated with each secondary location. The operations can also include accessing a database of real properties listed for sale or lease, querying the database of real properties using a search query including the primary location and the one or more real property criteria, and receiving a result set from the database of real properties in response to the querying, wherein the result set includes real properties in the database that meet the search query. The operations can also include clustering the result set into one or more clusters of real properties, for each cluster of the one or more clusters, determining a travel time from each secondary location to each cluster based on the mode of transportation for that secondary location, and causing the result set to be displayed on a map graphical user interface. The operations can further include receiving an indication of a selection of one of the real properties on the map, and causing an expanded map section to be displayed that includes the selected real property and the one or more secondary locations associated with the selected real property.

The operations can further include receiving one or more adjusted desired travel times associated with corresponding secondary locations, for each real property in a given cluster of the one or more clusters, determining a travel time from each secondary location to each real property in the given cluster, and generating an adjusted filtered result set of real properties from the result set based on the travel times from each real property to each associated secondary location and the adjusted desired travel time for that secondary location. The operations can also include causing a map showing the adjusted filtered result set of real properties to be displayed.

BRIEF DESCRIPTION OF THE DRAWINGS

FIG. 4 is a diagram of an example graphical user interface of an improved real estate search system showing home criteria entry elements in accordance with some implementations.

DETAILED DESCRIPTION

Some implementations include improved real estate search methods and systems. In contrast to some conventional systems that list the proximity to interest areas after the residency locations are selected, some implementations of the disclosed subject matter permit a user to list and filter real property listings based on proximity to interest areas (or secondary locations) prior to selection of one or more of the real property listings. When performing improved real estate search functions, it may be helpful for a system to suggest real properties and/or to make predictions about real properties that a user may be interested in. To make predictions or suggestions, a probabilistic model (or other model as described below in conjunction with FIG. 12) can be used to make an inference (or prediction) about aspects of improved real estate search such as predicting order to present results in and predicting other properties a user may be interested based on past searches. Accordingly, it may be helpful to make an inference regarding a probability that a user may interested in a given property. Other aspects can be predicted or suggested as described below.

Houses for sale are used as a non-limiting illustrative example herein. It will be appreciated that the disclosed subject matter can be configured for other searches such as property rentals, commercial real-estate for sale or rent, and any other property types where a user would benefit from the types of searching described herein.

Figure 1:
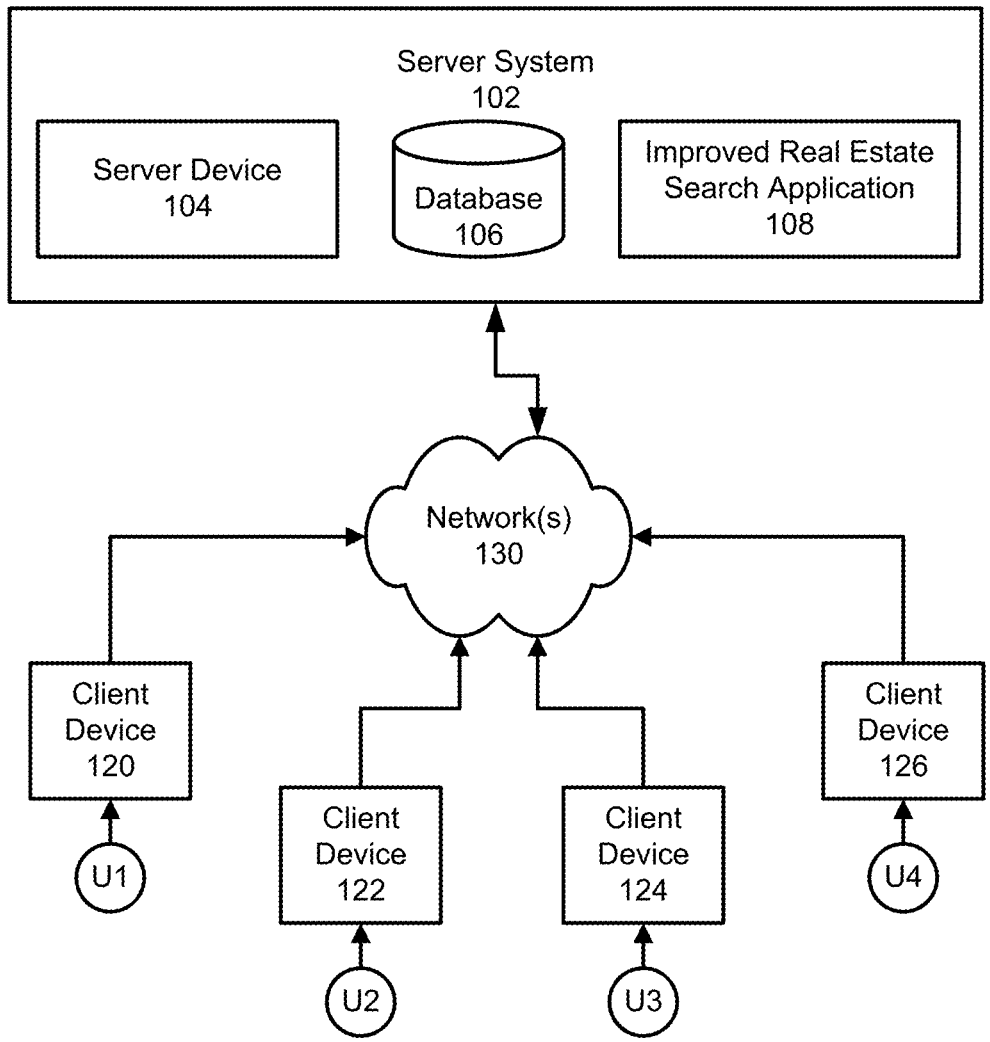
FIG. 1 is a block diagram of an example system and a network environment which may be used for one or more implementations described herein.

FIG. 1 illustrates a block diagram of an example network environment 100, which may be used in some implementations described herein. In some implementations, network environment 100 includes one or more server systems, e.g., server system 102 in the example of FIG. 1A. Server system 102 can communicate with a network 130, for example. Server system 102 can include a server device 104 and a database 106 or other data store or data storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Some blocks (e.g., 102, 104, and 106) may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service or other type of network service, implemented on server system 102. For example, respective client devices 120, 122, 124, and 126 may communicate data to and from one or more server systems (e.g., server system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, image compositions (e.g., albums that include one or more images, image collages, videos, etc.), audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text videoconferences or chat with other users of the service, etc. In some implementations, a "user" can include one or more programs or virtual entities, as well as persons that interface with the system or network.

A user interface can enable display of images, image compositions, data, and other content as well as communications, privacy settings, notifications, and other data on client devices 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide improved real estate search functions.

Various implementations of features described herein can use any type of system and/or service. Any type of electronic device can make use of features described herein. Some implementations can provide one or more features described herein on client or server devices disconnected from or intermittently connected to computer networks.

Figure 2:
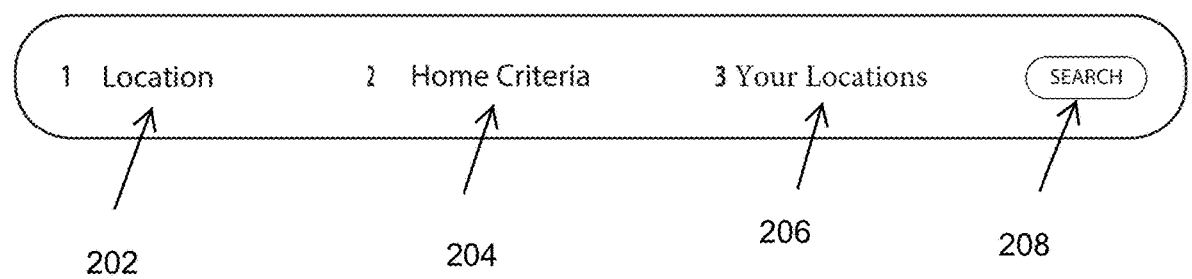
FIG. 2 is a diagram of an example graphical user interface of an improved real estate search system showing the location, home criteria, and Your Locations elements in accordance with some implementations.

FIG. 2 is a diagram of an example graphical user interface 200 of an improved real estate search system showing the location, home criteria, and Your Locations elements in accordance with some implementations. In particular, the GUI 200 includes a location element 202, a home criteria element 204, a Your Locations element 206, and a search element 208.

In operation, a user can perform a search for real estate (e.g., a home or other type of real estate) by selecting the location element 202 entering a location (or primary location), selecting the home criteria element 204 and entering criteria for the home, selecting the "Your Locations" element 206, and selecting search 208.

Figure 3:
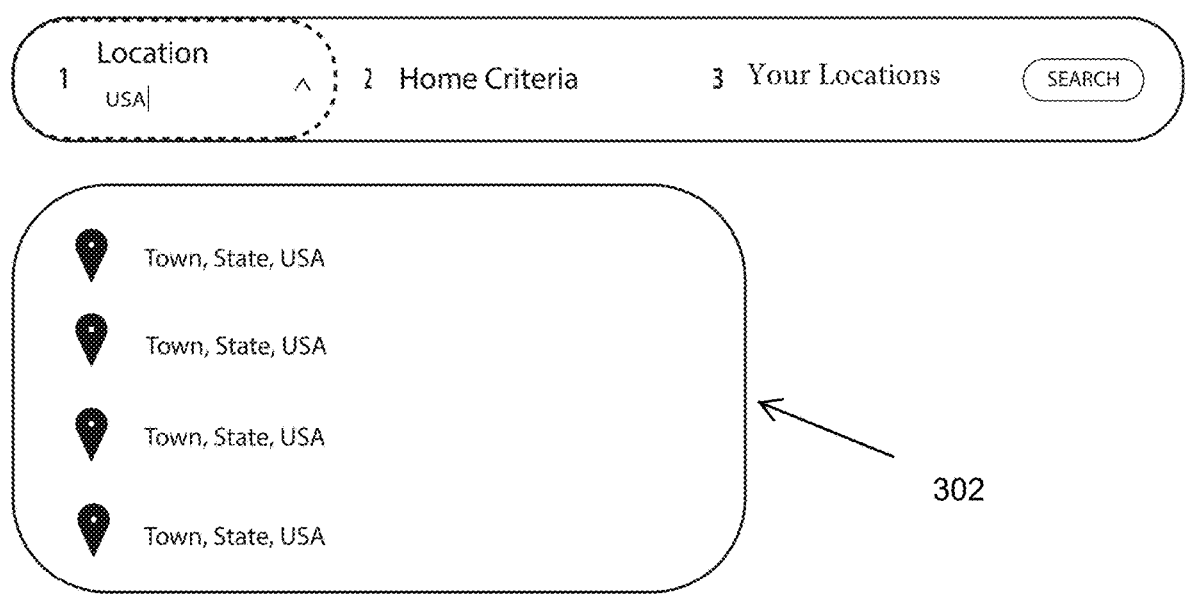
FIG. 3 is a diagram of an example graphical user interface of an improved real estate search system showing the location entry elements in accordance with some implementations.

FIG. 3 is a diagram of an example graphical user interface of an improved real estate search system showing the location entry elements in accordance with some implementations. In particular, FIG. 3 shows that a when a location is being entered a selection box 302 appears in which a user can select the location without further entry.

Figure 4:
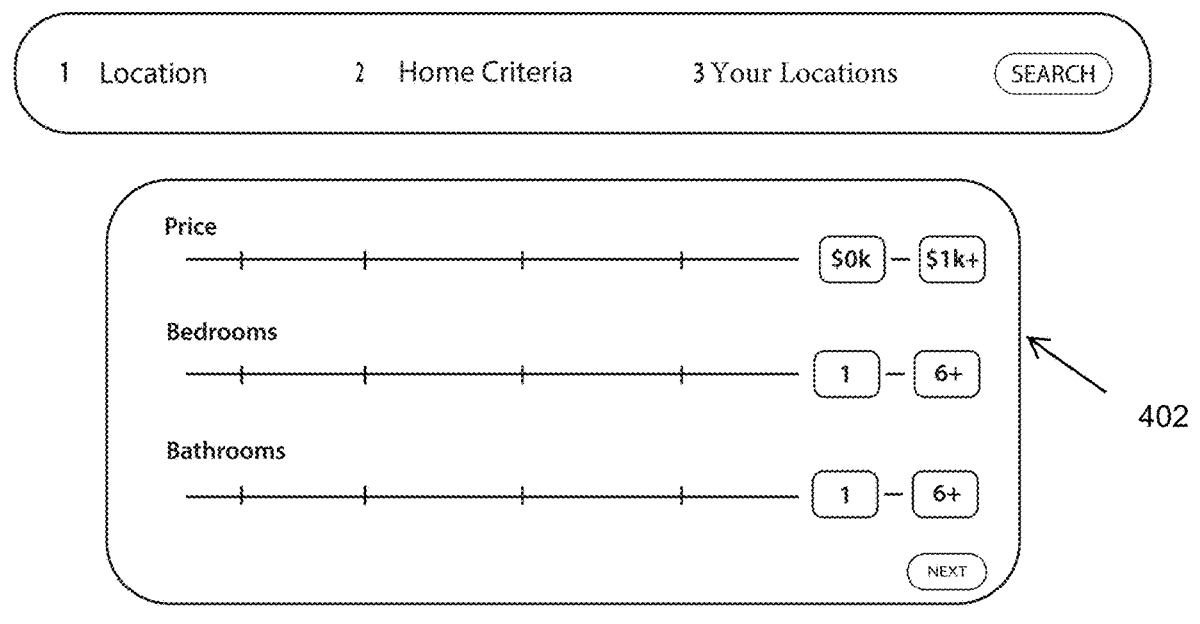

FIG. 4 is a diagram of an example graphical user interface of an improved real estate search system showing home criteria entry elements in accordance with some implementations. When a user selects the home criteria element 204, a home criteria element 402 is displayed and can be used to enter home criteria such as price or price range, number of bedrooms or range of bedrooms, and number of bathrooms or range of number of bathrooms.

Figure 5:
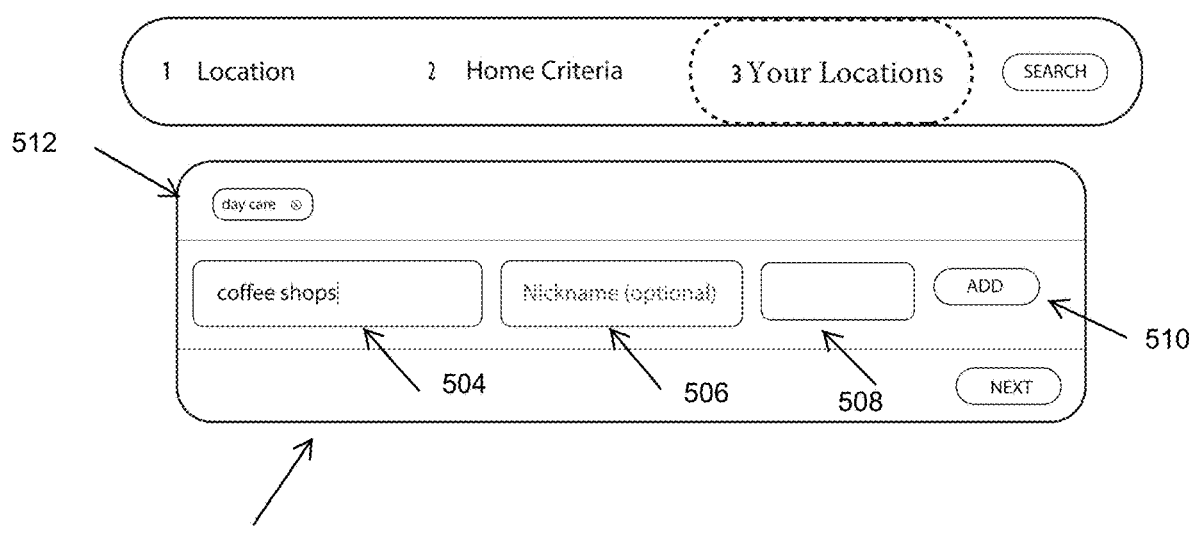
FIG. 5 is a diagram of an example graphical user interface of an improved real estate search system showing the Your Locations entry elements in accordance with some implementations.

FIG. 5 is a diagram of an example graphical user interface of an improved real estate search system showing the Your Locations entry elements in accordance with some implementations. When the Your Locations element 206 is selected, a Your Locations element 502 is displayed. In The Your location element 502, a user can enter a secondary location by address or type of location (e.g., coffee shop, daycare, work address, school, place of worship, etc.) at 504. A nickname can be entered at 506. Mode of transportation can be selected using 508. Once the information has been entered, the location can be added by selecting the Add button 510. Multiple secondary locations can be added. The added secondary locations are displayed in a tray 512.

Figure 6:
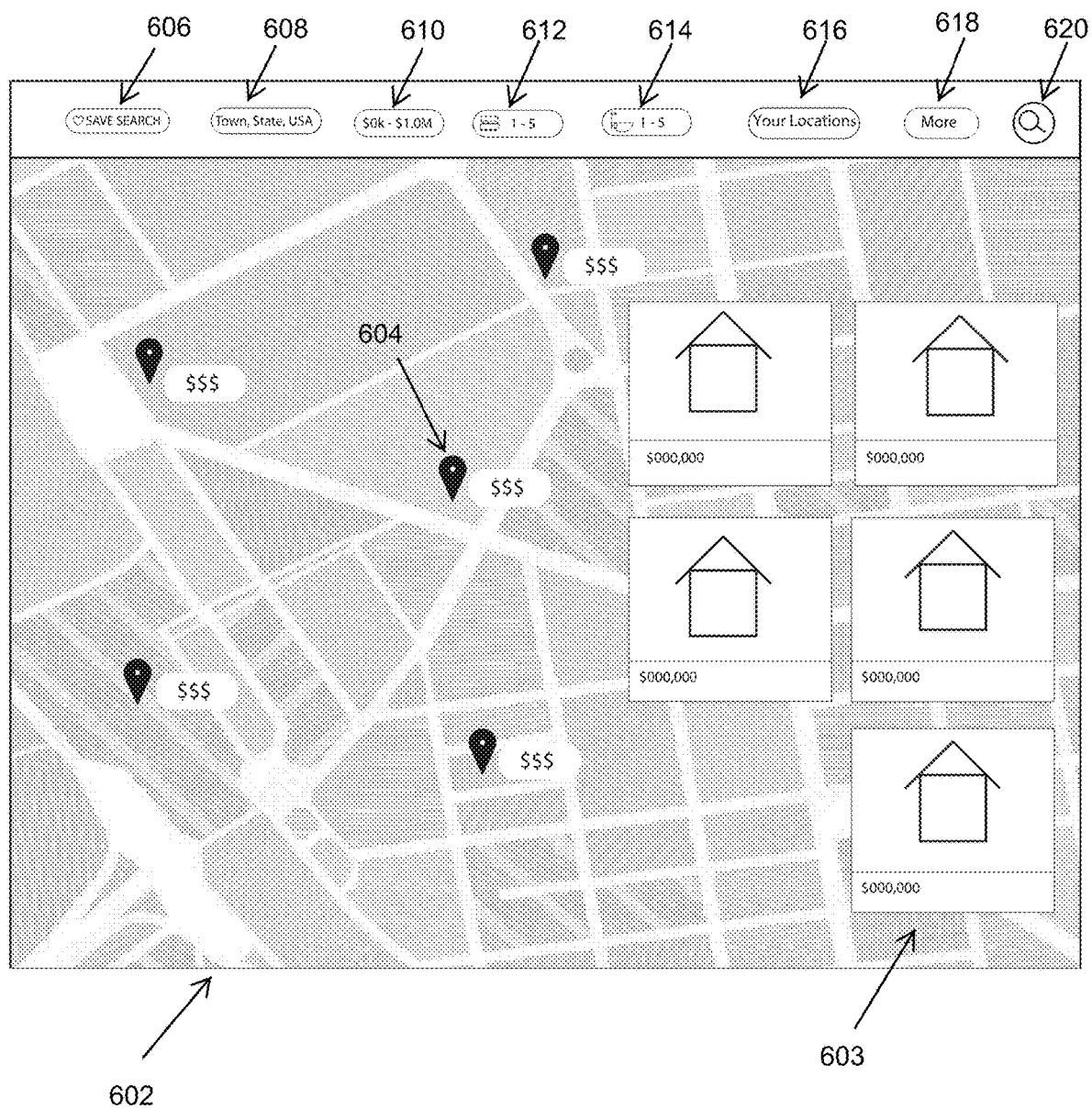
FIG. 6 is a diagram of an example graphical user interface of an improved real estate search system showing a map view of first search results in accordance with some implementations.

FIG. 6 is a diagram of an example graphical user interface of an improved real estate search system showing a map view 600 of first search results in accordance with some implementations. The map view 600 includes a map element 602 showing result makers 604 and result pictures 603. The map view 600 also includes a save search element 606, location element 608, price element 610, bedrooms element 612, bathroom element 614, Your Locations element 616, a more element 618, and a search element 620.

Figure 10:
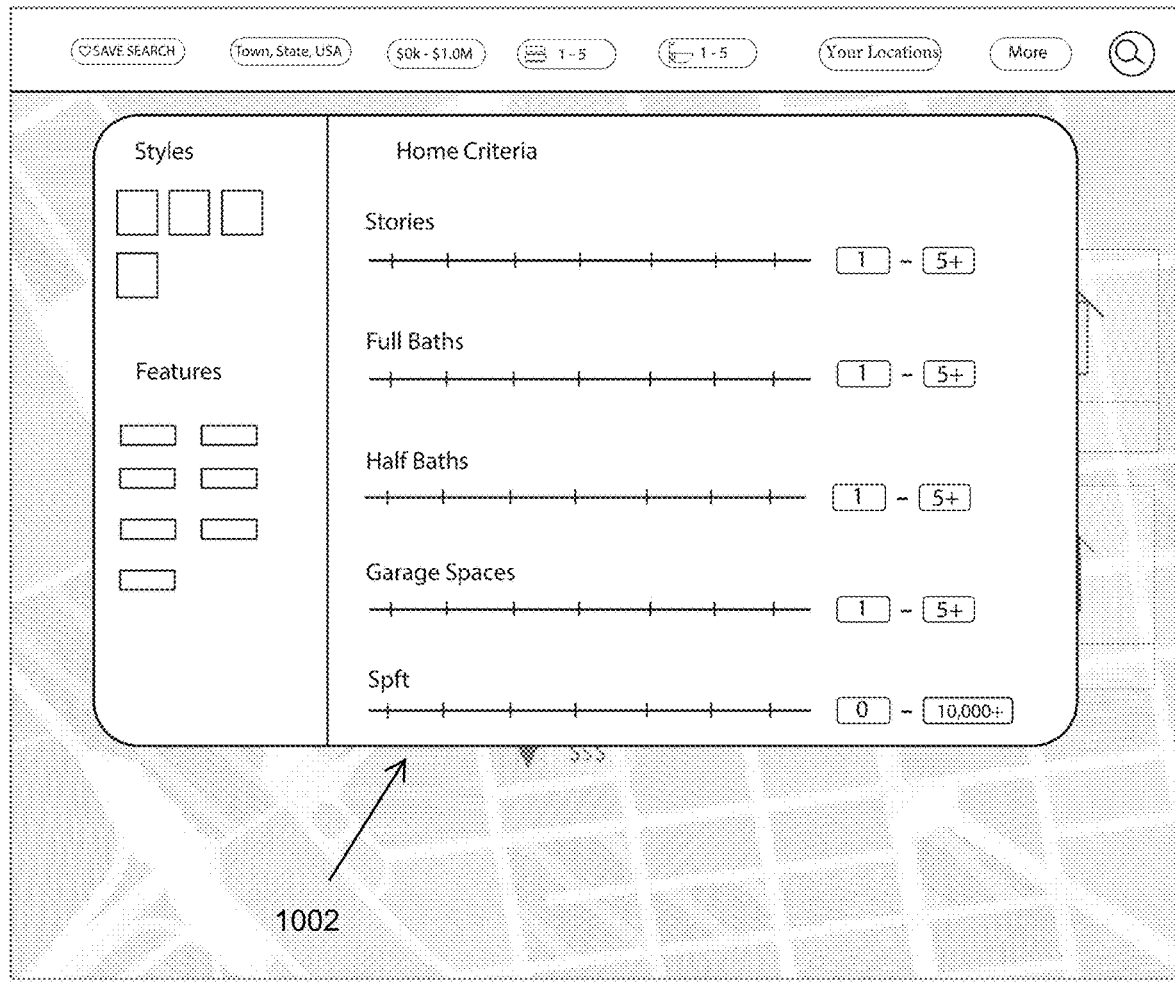
FIG. 10 is a diagram of an example graphical user interface of an improved real estate search system showing home criteria adjustment elements in accordance with some implementations.

In some implementations, users do not initially specify their desired commute times. Rather, users initially specify their points of interest by address, location, etc. (i.e., the Your Locations criteria)) and then have the ability to filter the results using sliders (e.g., as shown in FIGS. 7 and 10).

Figure 7:
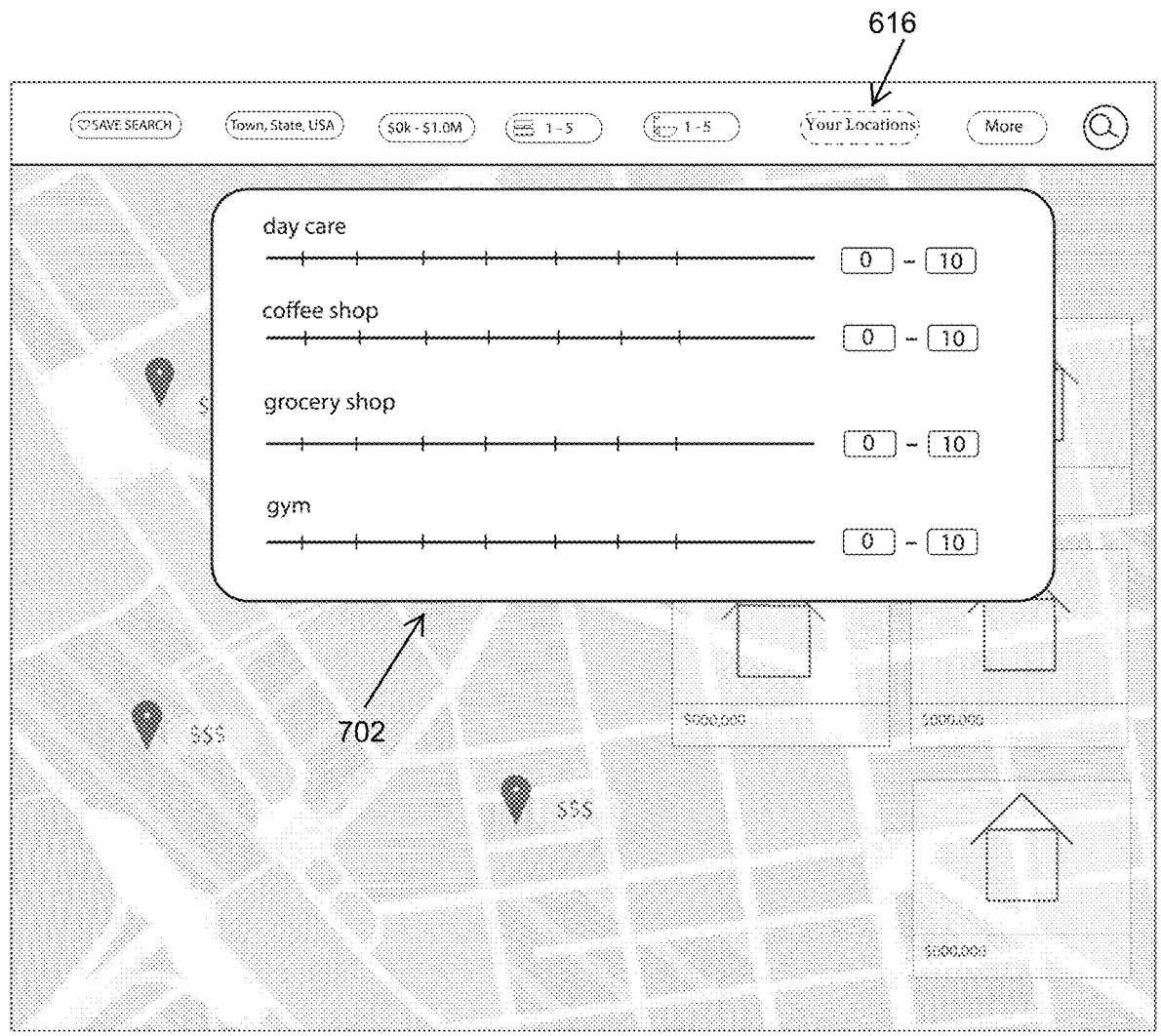
FIG. 7 is a diagram of an example graphical user interface of an improved real estate search system showing Your Locations adjustment elements in accordance with some implementations.

FIG. 7 is a diagram of an example graphical user interface of an improved real estate search system showing Your Locations adjustment elements in accordance with some implementations. When the Your Locations element 616 is selected, a Your Locations adjustment window 702 is displayed. In this window, a user can adjust the desired maximum time to any of the secondary locations using a slide interface element. Once the times are adjusted, the system will filter the search results based on the adjusted times set on the respective sliders. It is important to note that users can filter the listings result set based on commute types for all of their secondary locations (e.g., Your Locations) at one time via the settings for each secondary location in the slider interface, for example.

Figure 8:
FIG. 8 is a diagram of an example graphical user interface of an improved real estate search system showing an updated map based on updated Your Locations elements in accordance with some implementations.

FIG. 8 is a diagram of an example graphical user interface of an improved real estate search system showing an updated map based on updated Your Locations elements in accordance with some implementations. In FIG. 8, the map display has been updated to reflect the adjusted times from Your Locations. For instance, in the simple example shown in FIG. 6 there are 5 result markers displayed for the initial results. FIG. 8 shows the filtered results where three result markers are shown.

Figure 9:
FIG. 9 is a diagram of an example graphical user interface of an improved real estate search system showing routes between a selected real property and the secondary locations in accordance with some implementations.

FIG. 9 is a diagram of an example graphical user interface of an improved real estate search system showing routes between a selected real property and the secondary locations in accordance with some implementations. In particular, a result real property 902 is selected which causes the map to show details for that property including the route between the selected property 902 and each of the secondary locations 904-910 (e.g., as entered in the Your Locations interface).

FIG. 10 is a diagram of an example graphical user interface of an improved real estate search system showing home criteria adjustment elements in accordance with some implementations. In addition to further filtering the search results via the Your Locations interface as described above, the more element 618 can be selected to cause a user interface 1002 to be displayed in which the results can further be filtered by adjusting home criteria via slider interface elements and selecting styles or features. Thus, as the user views the results, the results can be further refined based on any of the criteria mentioned above.

Figure 11:
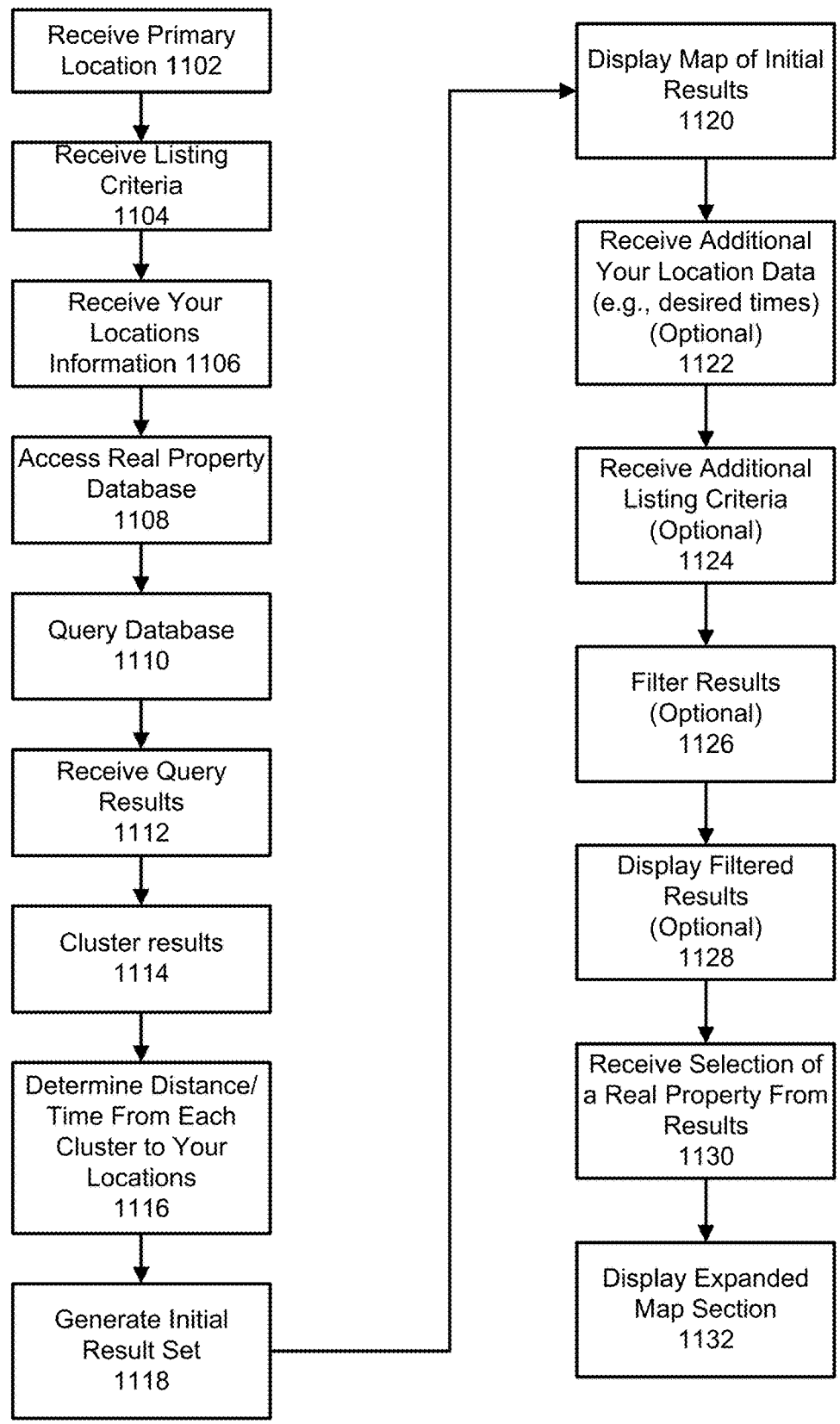
FIG. 11 is a flowchart of an example improved real estate search process in accordance with some implementations.

FIG. 11 is a flowchart of an example improved real estate search process in accordance with some implementations. Processing begins at 1102, where a primary location is received. The primary location can be in the form of a postal code (or ZIP code), a street address, a city, or a county, or the like. Processing continues to 1104.

At 1104, one or more real property criteria are received. For example, the one or more real property criteria can include one or more of a listing price range, a number of bedrooms range, and a number of bathrooms range. Processing continues to 1106.

At 1106, one or more secondary locations are received along with a mode of transportation associated with each secondary location, and a desired travel time associated with each secondary location. In some implementations, the one or more secondary locations can include a street address, or a location type. The mode of transportation can include one of car, train, bus, bicycling, or walking. Processing continues to 1108.

At 1108, a database of real properties listed for sale is accessed. Processing continues to 1110.

At 1110, the database of real properties is queried using a search query including the primary location and the one or more real property criteria. In some implementations, the secondary locations (and corresponding mode of transportation) are received (e.g., at 1106) prior to searching the database. Processing continues to 1112.

At 1112, a result set from the database of real properties is received in response to the querying. In some implementations, the result set includes real properties in the database that meet or match the search query criteria. Matching can include exact matching or can include being the closest to the criteria or can include being within a certain threshold value of the criteria. Processing continues to 1114.

At 1114, the result set is clustered into one or more clusters of real properties. For example, the clustering can include clustering the real properties in the result set into the one or more clusters based on the respective locations of the real properties. In some implementations, each cluster can represent one or more listings that are in close enough proximity to each other such that their commute times for the commute types don't differ by much (e.g., differ by an amount less than a threshold value). The clustering process can include, but is not limited to, using a clustering technique that includes a density-based clustering non-parametric algorithm. Sin such an algorithm, given a set of points in some space, the algorithm groups together points that are closely packed together (e.g., points with many nearby neighbors), marking as outliers points that lie alone in low-density regions (e.g., whose nearest neighbors are too far away). Other suitable clustering techniques can be used as well. Processing continues to 1116.

At 1116, for each cluster of the one or more clusters, a travel time is determined from each secondary location to each cluster. In some implementations, determining travel time from each secondary location to each cluster can include accessing a mapping service to determine a geographic location of each of the secondary locations relative to a corresponding cluster, querying the mapping service using the geographic location of each of the secondary locations, a geographic location of the corresponding cluster, and one or more of the modes of transportation, and receiving a travel time from the geographic location of the corresponding cluster to each of the secondary locations for one or more of the transportation modes. In this way, listings within a given cluster will share the same commute times to the secondary locations for each respective mode of transportation. Processing continues to 1118.

At 1118, an initial result set is generated from the result set based on the travel times from each cluster to each associated secondary location. Processing continues to 1120.

At 1120, a map showing the initial result set of real properties is caused to be displayed. Processing continues to 1122.

At 1122, optionally, additional Your Location data is received. For example, maximum travel times per secondary location and selected mode of travel can be received via graphical user interface (e.g., FIG. 7 including a slider for each secondary location). Processing continues to 1124.

At 1124, optionally, additional listing criteria is received (e.g., via a graphical user interface similar to that shown in FIG. 10). Processing continues to 1126.

At 1126, optionally, the initial results are filtered based on the additional secondary location criteria and/or the additional listing criteria. Processing continues to 1128.

At 1128, optionally, the filtered results are caused to be displayed (e.g., on a map graphical interface). Processing continues to 1130.

At 1130, an indication of a selection of one of the real properties on the map is received. Processing continues to 1132.

At 1132, an expanded map section is caused to be displayed that includes the selected real property and the one or more secondary locations associated with the selected real property.

Some implementations can include saving the primary location, the one or more real property criteria, the one or more secondary locations, and the mode of transportation associated with each secondary location, as a saved search query, executing the saved search query to obtain an updated search result set, and transmitting a notification of any real properties in the updated search result set not in the original result set.

Some implementations can include receiving one or more desired travel times associated with corresponding secondary locations, for each real property in a given cluster of the one or more clusters, determining a travel time from each secondary location to each real property in the given cluster, generating a filtered result set of real properties from the result set based on the travel times from each real property to each associated secondary location and the desired travel time for that secondary location, and causing a map showing the filtered result set of real properties to be displayed.

Figure 12:
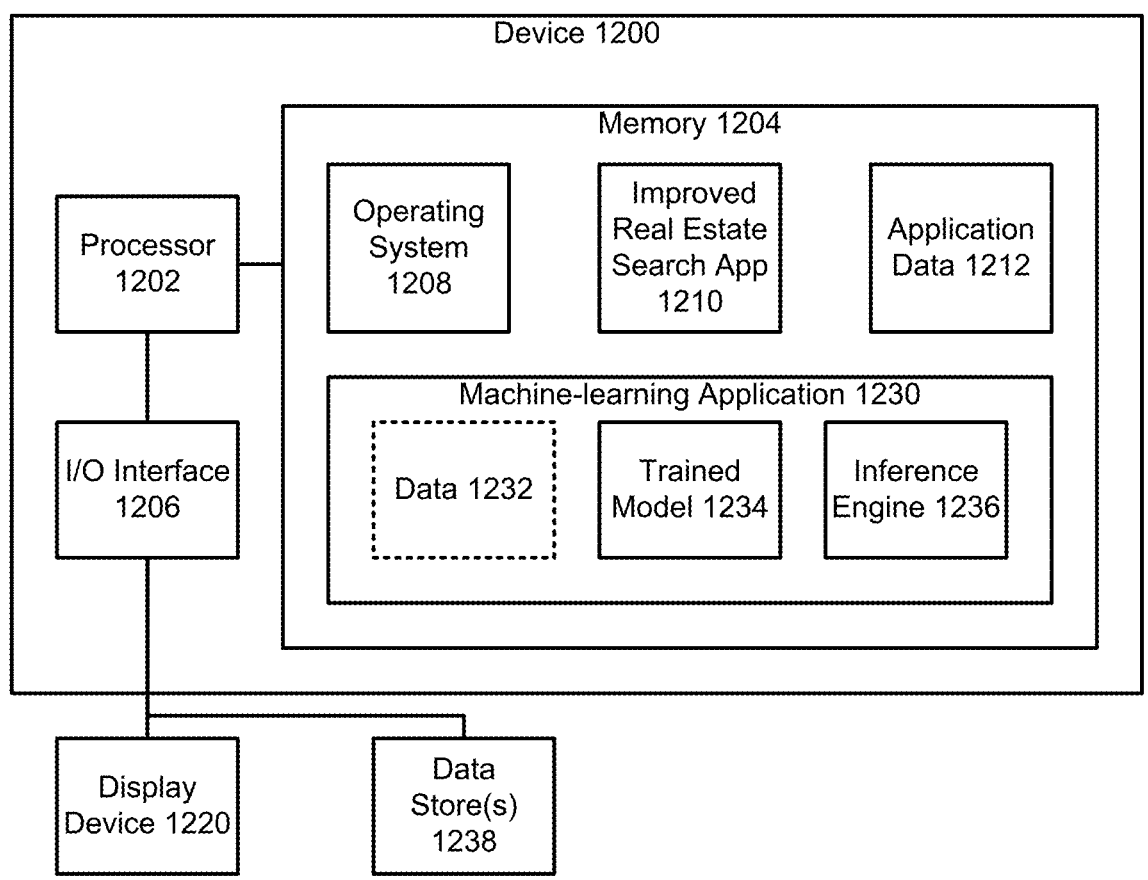
FIG. 12 is a block diagram of an example computing device which may be used for one or more implementations described herein.

FIG. 12 is a block diagram of an example device 1200 which may be used to implement one or more features described herein. In one example, device 1200 may be used to implement a client device, e.g., any of client devices 120-126 shown in FIG. 1. Alternatively, device 1200 can implement a server device, e.g., server device 104, etc. In some implementations, device 1200 may be used to implement a client device, a server device, or a combination of the above. Device 1200 can be any suitable computer system, server, or other electronic or hardware device as described above.

One or more methods described herein (e.g., 1100) can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 1200 includes a processor 1202, a memory 1204, and I/O interface 1206. Processor 1202 can be one or more processors and/or processing circuits to execute program code and control basic operations of the device 1200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 1202 may include one or more co-processors that implement neural-network processing. In some implementations, processor 1202 may be a processor that processes data to produce probabilistic output, e.g., the output produced by processor 1202 may be imprecise or may be accurate within a range from an expected output. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1204 is typically provided in device 1200 for access by the processor 1202 and may be any suitable processor-readable storage medium, such as random-access memory (RAM), read-only memory (ROM), Electrically Erasable Read-only Memory (EEPROM), Flash memory, etc., suitable for storing instructions for execution by the processor, and located separate from processor 1202 and/or integrated therewith. Memory 1204 can store software operating on the server device 1200 by the processor 1202, including an operating system 408, machine-learning application 1230, improved real estate search application 1210, and application data 1212. Other applications may include applications such as a data display engine, web hosting engine, image display engine, notification engine, social networking engine, etc. In some implementations, the machine-learning application 1230 and improved real estate search application 1210 can each include instructions that enable processor 1202 to perform functions described herein, e.g., some or all of the methods of FIG. 11.

The machine-learning application 1230 can include one or more NER implementations for which supervised and/or unsupervised learning can be used. The machine learning models can include multi-task learning based models, residual task bidirectional LSTM (long short-term memory) with conditional random fields, statistical NER, etc. The Device can also include an improved real estate search application 1210 as described herein and other applications. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 1230 may utilize Bayesian classifiers, support vector machines, neural networks, or other learning techniques. In some implementations, machine-learning application 1230 may include a trained model 1234, an inference engine 1236, and data 1232. In some implementations, data 1232 may include training data, e.g., data used to generate trained model 1234. For example, training data may include any type of data suitable for training a model for improved real estate search tasks, such as properties, property criteria, labels, thresholds, etc. associated with improved real estate search described herein. Training data may be obtained from any source, e.g., a data repository specifically marked for training, data for which permission is provided for use as training data for machine-learning, etc. In implementations where one or more users permit use of their respective user data to train a machine-learning model, e.g., trained model 1234, training data may include such user data. In implementations where users permit use of their respective user data, data 1232 may include permitted data.

In some implementations, data 1232 may include collected data such as previous searches. In some implementations, training data may include synthetic data generated for the purpose of training, such as data that is not based on user input or activity in the context that is being trained, e.g., data generated from simulated conversations, computer-generated images, etc. In some implementations, machine-learning application 1230 excludes data 1232. For example, in these implementations, the trained model 1234 may be generated, e.g., on a different device, and be provided as part of machine-learning application 1230. In various implementations, the trained model 1234 may be provided as a data file that includes a model structure or form, and associated weights. Inference engine 1236 may read the data file for trained model 1234 and implement a neural network with node connectivity, layers, and weights based on the model structure or form specified in trained model 1234.

Machine-learning application 1230 also includes a trained model 1234. In some implementations, the trained model 1234 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 1232 or application data 1212. Such data can include, for example, images, e.g., when the trained model is used for improved real estate search functions. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a one or more suggested properties, etc. depending on the specific trained model. In some implementations, model form or structure also specifies a number and/or type of nodes in each layer.

In different implementations, the trained model 1234 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 1234 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 1232, to produce a result.

For example, training may include applying supervised learning techniques. In supervised learning, the training data can include a plurality of inputs (e.g., a set of images) and a corresponding expected output for each input (e.g., one or more labels for each image representing aspects of a project corresponding to the images such as services or products needed or recommended). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided, and the model may be trained to differentiate data, e.g., to cluster input data into a plurality of groups, where each group includes input data that are similar in some manner. For example, the model may be trained to suggest properties that are associated with searches and/or select thresholds for improved real estate search suggestions.

In another example, a model trained using unsupervised learning may cluster words based on the use of the words in data sources. In some implementations, unsupervised learning may be used to produce knowledge representations, e.g., that may be used by machine-learning application 1230. In various implementations, a trained model includes a set of weights, or embeddings, corresponding to the model structure. In implementations where data 1232 is omitted, machine-learning application 1230 may include trained model 1234 that is based on prior training, e.g., by a developer of the machine-learning application 1230, by a third-party, etc. In some implementations, trained model 1234 may include a set of weights that are fixed, e.g., downloaded from a server that provides the weights.

Machine-learning application 1230 also includes an inference engine 1236. Inference engine 1236 is configured to apply the trained model 1234 to data, such as application data 1212, to provide an inference. In some implementations, inference engine 1236 may include software code to be executed by processor 1202. In some implementations, inference engine 1236 may specify circuit configuration (e.g., for a programmable processor, for a field programmable gate array (FPGA), etc.) enabling processor 1202 to apply the trained model. In some implementations, inference engine 1236 may include software instructions, hardware instructions, or a combination. In some implementations, inference engine 1236 may offer an application programming interface (API) that can be used by operating system 1208 and/or improved real estate search application 1210 to invoke inference engine 1236, e.g., to apply trained model 1234 to application data 1212 to generate an inference.

Machine-learning application 1230 may provide several technical advantages. For example, when trained model 1234 is generated based on unsupervised learning, trained model 1234 can be applied by inference engine 1236 to produce knowledge representations (e.g., numeric representations) from input data, e.g., application data 1212. For example, a model trained for improved real estate search tasks may produce predictions and confidences for given input information about a project being proposed or planned. A model trained for suggesting improved real estate search tasks may produce a suggestion for one or more properties based on input information. In some implementations, such representations may be helpful to reduce processing cost (e.g., computational cost, memory usage, etc.) to generate an output (e.g., a suggestion, a prediction, a classification, etc.). In some implementations, such representations may be provided as input to a different machine-learning application that produces output from the output of inference engine 1236.

In some implementations, knowledge representations generated by machine-learning application 1230 may be provided to a different device that conducts further processing, e.g., over a network. In such implementations, providing the knowledge representations rather than the images may provide a technical benefit, e.g., enable faster data transmission with reduced cost. In another example, a model trained for improved real estate search may produce an improved real estate search signal for one or more searches being processed by the model.

In some implementations, machine-learning application 1230 may be implemented in an offline manner. In these implementations, trained model 1234 may be generated in a first stage and provided as part of machine-learning application 1230. In some implementations, machine-learning application 1230 may be implemented in an online manner. For example, in such implementations, an application that invokes machine-learning application 1230 (e.g., operating system 1208, one or more of improved real estate search application 1210 or other applications) may utilize an inference produced by machine-learning application 1230, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 1234, e.g., to update embeddings for trained model 1234.

In some implementations, machine-learning application 1230 may be implemented in a manner that can adapt to particular configuration of device 1200 on which the machine-learning application 1230 is executed. For example, machine-learning application 1230 may determine a computational graph that utilizes available computational resources, e.g., processor 1202. For example, if machine-learning application 1230 is implemented as a distributed application on multiple devices, machine-learning application 1230 may determine computations to be carried out on individual devices in a manner that optimizes computation. In another example, machine-learning application 1230 may determine that processor 1202 includes a GPU with a particular number of GPU cores (e.g., 1000) and implement the inference engine accordingly (e.g., as 1000 individual processes or threads).

In some implementations, machine-learning application 1230 may implement an ensemble of trained models. For example, trained model 1234 may include a plurality of trained models that are each applicable to same input data. In these implementations, machine-learning application 1230 may choose a particular trained model, e.g., based on available computational resources, success rate with prior inferences, etc. In some implementations, machine-learning application 1230 may execute inference engine 1236 such that a plurality of trained models is applied. In these implementations, machine-learning application 1230 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 1208 or one or more other applications, e.g., improved real estate search application 1210.

In different implementations, machine-learning application 1230 can produce different types of outputs. For example, machine-learning application 1230 can provide representations or clusters (e.g., numeric representations of input data), labels (e.g., for input data that includes images, documents, etc.), phrases or sentences (e.g., descriptive of an image or video, suitable for use as a response to an input sentence, suitable for use to determine context during a conversation, etc.), images (e.g., generated by the machine-learning application in response to input), audio or video (e.g., in response an input video, machine-learning application 1230 may produce an output video with a particular effect applied, e.g., rendered in a comic-book or particular artist's style, when trained model 1234 is trained using training data from the comic book or particular artist, etc. In some implementations, machine-learning application 1230 may produce an output based on a format specified by an invoking application, e.g., operating system 1208 or one or more applications, e.g., improved real estate search application 1210. In some implementations, an invoking application may be another machine-learning application. For example, such configurations may be used in generative adversarial networks, where an invoking machine-learning application is trained using output from machine-learning application 1230 and vice-versa.

Any of software in memory 1204 can alternatively be stored on any other suitable storage location or computer-readable medium. In addition, memory 1204 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 1204 and any other type of storage (magnetic disk, optical disk, magnetic tape, or other tangible media) can be considered "storage" or "storage devices."

I/O interface 1206 can provide functions to enable interfacing the server device 1200 with other systems and devices. Interfaced devices can be included as part of the device 1200 or can be separate and communicate with the device 1200. For example, network communication devices, storage devices (e.g., memory and/or database 106), and input/output devices can communicate via I/O interface 1206. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 1206 can include one or more display devices 1220 and one or more data stores 1238 (as discussed above). The display devices 1220 that can be used to display content, e.g., a user interface of an output application as described herein. Display device 1220 can be connected to device 1200 via local connections (e.g., display bus) and/or via networked connections and can be any suitable display device. Display device 1220 can include any suitable display device such as an LCD, LED, or plasma display screen, CRT, television, monitor, touchscreen, 3-D display screen, or other visual display device. For example, display device 1220 can be a flat display screen provided on a mobile device, multiple display screens provided in a goggles or headset device, or a monitor screen for a computer device.

The I/O interface 1206 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 12 shows one block for each of processor 1202, memory 1204, I/O interface 1206, and software blocks 1208, 1210, and 1230. These blocks may represent one or more processors or processing circuitries, operating systems, memories, I/O interfaces, applications, and/or software modules. In other implementations, device 1200 may not have all of the components shown and/or may have other elements including other types of elements instead of, or in addition to, those shown herein. While some components are described as performing blocks and operations as described in some implementations herein, any suitable component or combination of components of environment 100, device 1200, similar systems, or any suitable processor or processors associated with such a system, may perform the blocks and operations described.

In some implementations, logistic regression can be used for personalization (e.g., personalizing improved real estate search suggestions based on a user's pattern of search activity). In some implementations, the prediction model can be handcrafted including hand selected improved real estate search labels and thresholds. The mapping (or calibration) from ICA space to a predicted precision within the improved real estate search space can be performed using a piecewise linear model.

In some implementations, the improved real estate search system could include a machine-learning model (as described herein) for tuning the system (e.g., selecting improved real estate search suggestions and corresponding thresholds) to potentially provide improved accuracy. Inputs to the machine learning model can include ICA labels, an image descriptor vector that describes appearance and includes semantic information about improved real estate search. Example machine-learning model input can include labels for a simple implementation and can be augmented with descriptor vector features for a more advanced implementation. Output of the machine-learning module can include a prediction of one or more properties.

One or more methods described herein (e.g., method 1100) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
receiving a primary location;
receiving one or more real property criteria;
receiving one or more secondary locations and a mode of transportation associated with each secondary location;
accessing a database of real properties listed for sale or lease;
querying the database of real properties using a search query including the primary location and the one or more real property criteria;
receiving a result set from the database of real properties in response to the querying, wherein the result set includes real properties in the database that meet the search query;
clustering the result set into one or more clusters of real properties;
for each cluster of the one or more clusters, determining a travel time from each secondary location to each cluster based on the mode of transportation for that secondary location;
causing the result set to be displayed on a map graphical user interface;
receiving an indication of a selection of one of the real properties on the map; and
causing an expanded map section to be displayed that includes the selected real property and the one or more secondary locations associated with the selected real property.

2. The method of claim 1, wherein the primary location can include one or more of a postal code, a street address, a city, or a county.

3. The method of claim 1, wherein the one or more real property criteria includes one or more of a listing price range, a number of bedrooms range, and a number of bathrooms range.

4. The method of claim 1, wherein the one or more secondary locations can include a street address, or a location type.

5. The method of claim 1, wherein the mode of transportation includes one of car, train, bus, bicycling, or walking.

6. The method of claim 1, wherein the clustering includes clustering the real properties in the result set into the one or more clusters based on the respective locations of the real properties in the result set and proximity of the real properties relative to each other.

7. The method of claim 1, wherein determining travel time from each secondary location to each cluster includes:
accessing a mapping service to determine a geographic location of each of the secondary locations relative to a corresponding cluster;
querying the mapping service using the geographic location of each of the secondary locations, a geographic location of the corresponding cluster, and the mode of transportation associated with the secondary location; and
receiving a travel time from the geographic location of the corresponding cluster to each of the secondary locations.

8. The method of claim 1, further comprising:
saving the primary location, the one or more real property criteria, the one or more secondary locations, and the mode of transportation associated with each secondary location as a saved search query;
executing the saved search query to obtain an updated search result set; and
transmitting a notification of any real properties in the updated search result set not in the result set.

9. The method of claim 1, further comprising:
receiving one or more desired travel times associated with corresponding secondary locations;
generating a filtered result set of real properties from the result set based on a comparison of the travel times from each cluster to each associated secondary location with the desired travel time for the corresponding secondary location; and
causing a map showing the filtered result set of real properties to be displayed.

10. A system comprising:
one or more processors coupled to a computer-readable medium having stored thereon software instructions that, when executed by the one or more processors, cause the one or more processors to perform operations including:
receiving a primary location;
receiving one or more real property criteria;
receiving one or more secondary locations and a mode of transportation associated with each secondary location;
accessing a database of real properties listed for sale or lease;
querying the database of real properties using a search query including the primary location and the one or more real property criteria;
receiving a result set from the database of real properties in response to the querying, wherein the result set includes real properties in the database that meet the search query;

clustering the result set into one or more clusters of real properties;

for each cluster of the one or more clusters, determining a travel time from each secondary location to each cluster based on the mode of transportation for that secondary location;

causing the result set to be displayed on a map graphical user interface;

receiving an indication of a selection of one of the real properties on the map; and causing an expanded map section to be displayed that includes the selected real property and the one or more secondary locations associated with the selected real property.

11. The system of claim 10, wherein the primary location can include one or more of a postal code, a street address, a city, or a county.

12. The system of claim 10, wherein the one or more real property criteria includes one or more of a listing price range, a number of bedrooms range, and a number of bathrooms range.

13. The system of claim 10, wherein the one or more secondary locations can include a street address, or a location type.

14. The system of claim 10, wherein the mode of transportation includes one of car, train, bus, bicycling, or walking.

15. The system of claim 10, wherein the clustering includes clustering the real properties in the result set into the one or more clusters based on the respective locations of the real properties in the result set and proximity of the real properties relative to each other.

16. The system of claim 10, wherein determining travel time from each secondary location to each cluster includes:

accessing a mapping service to determine a geographic location of each of the secondary locations relative to a corresponding cluster;

querying the mapping service using the geographic location of each of the secondary locations, a geographic location of the corresponding cluster, and the mode of transportation associated with the secondary location; and receiving a travel time from the geographic location of the corresponding cluster to each of the secondary locations.

17. The system of claim 10, wherein the operations further comprise:

saving the primary location, the one or more real property criteria, the one or more secondary locations, and the mode of transportation associated with each secondary location as a saved search query;

executing the saved search query to obtain an updated search result set; and transmitting a notification of any real properties in the updated search result set not in the result set.

18. The system of claim 10, wherein the operations further comprise:

receiving one or more desired travel times associated with corresponding secondary locations;

generating a filtered result set of real properties from the result set based on a comparison of the travel times from each cluster to each associated secondary location with the desired travel time for the corresponding secondary location; and causing a map showing the filtered result set of real properties to be displayed.

19. A computer-readable medium having stored thereon software instructions that, when executed by one or more processors, cause the one or more processors to perform operations including:

receiving a primary location;

receiving one or more real property criteria;

receiving one or more secondary locations and a mode of transportation associated with each secondary location;

accessing a database of real properties listed for sale or lease;

querying the database of real properties using a search query including the primary location and the one or more real property criteria;

receiving a result set from the database of real properties in response to the querying, wherein the result set includes real properties in the database that meet the search query;

clustering the result set into one or more clusters of real properties;

for each cluster of the one or more clusters, determining a travel time from each secondary location to each cluster based on the mode of transportation for that secondary location;

causing the result set to be displayed on a map graphical user interface;

receiving an indication of a selection of one of the real properties on the map; and causing an expanded map section to be displayed that includes the selected real property and the one or more secondary locations associated with the selected real property.

20. The computer-readable medium of claim 19, wherein the operations further comprise:

receiving one or more desired travel times associated with corresponding secondary locations;

for each real property in a given cluster of the one or more clusters, determining a travel time from each secondary location to each real property in the given cluster;

generating a filtered result set of real properties from the result set based on the travel times from each real property to each associated secondary location and the desired travel time for that secondary location; and causing a map showing the filtered result set of real properties to be displayed.

* * * * *